UNITED STATES PATENT OFFICE.

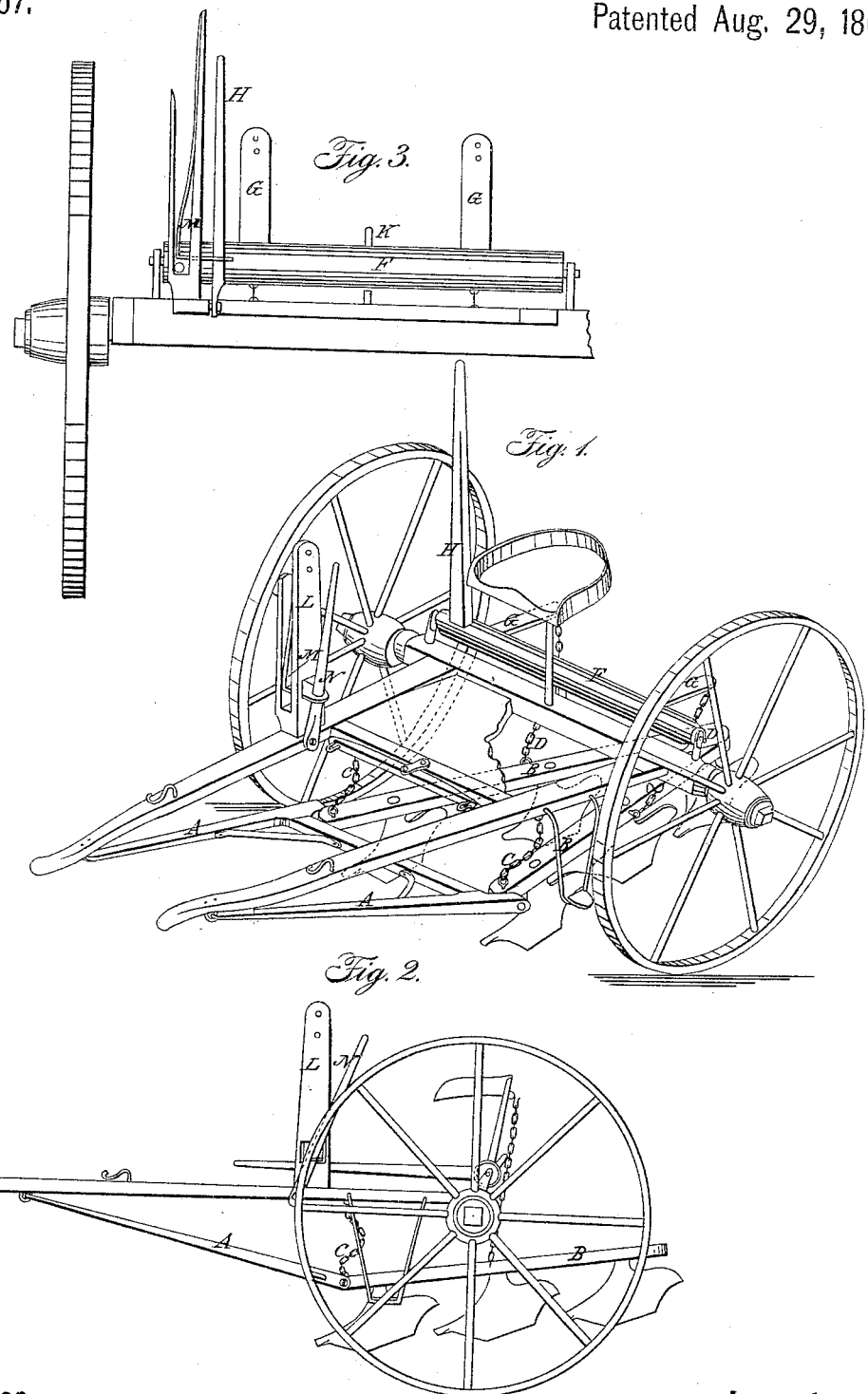

HORACE H. WEBSTER, OF CLAREMONT, NEW HAMPSHIRE.

IMPROVEMENT IN CULTIVATORS.

Specification forming part of Letters Patent No. 49,667, dated August 29, 1865.

*To all whom it may concern:*

Be it known that I, HORACE H. WEBSTER, of Claremont, in the county of Sullivan and State of New Hampshire, have invented a new and useful Improvement in Cultivators; and I do hereby declare that the following is a full, clear, and exact description of the construction and operation of the same, reference being had to the annexed drawings, making a part of this specification, in which—

Figure 1 is an isometrical perspective view of the cultivator complete in all its parts and shown in the position for cultivating. Fig. 2 is a side elevation, showing the lever depressed and the cultivator elevated. Fig. 3 is a front elevation of a portion of the cultivator, showing the lever in the same position as in Fig. 2.

The nature of my invention consists in providing better means than have heretofore been devised for raising the plows of a cultivator from the ground and sustaining them securely and easily, and also for graduating the depth of the furrow at the will of the operator.

I construct a cultivator in the usual form, except that I prefer to have one large plow with a double mold-board at the extreme rear end thereof and a series of smaller plows in front, as shown on the drawings.

I usually construct my cultivator in such a manner that it may be drawn by one horse, or by two or more horses working tandem; but I do not confine myself to that mode of construction.

In the drawings my cultivator is shown as I prefer to use it—namely, a two-wheeled carriage with a driver's seat, shafts, and platform, and the cultivator proper swinging under the platform by means hereinafter described.

At a point about fifteen inches (more or less) from the front end of the carriage-shafts, and under the same, I attach two other shafts, with a cross-bar and braces, as shown on the drawings by the letter A. These lower shafts extend to a point immediately in the rear of the front end of the platform, where they are connected with the front end of the cultivator proper by means of bolts that pass through the sides of the cultivator and said shafts, and make hinges upon which both the shafts and the cultivator may be swung up and down. This cultivator is shown by the letter B.

The forward end of the cultivator is attached to the bottom of the platform by means of chains C, and I further connect it therewith by means of chains D, that extend from the cultivator to the arms of a windlass that is attached to the rear end of the platform or axle of the carriage in the manner represented.

The cultivator proper is constructed in the form of a harrow having its ends reversed.

The windlass on the rear of the platform, or on the carriage-axle, is shown by the letter F. It has two arms, G, to the ends of which I attach the chains D, and it has also one upright arm placed at right angles with said arms G. I call it the lever H. This windlass has also a strong iron pin inserted at an angle of about forty-five degrees with the lever H and the arms G. I call it the stop K.

In the right-hand shaft of the carriage, and near the front end of the platform, I insert a slotted upright post, which is shown on the drawings by the letter L. In this slot I insert a spring, M, the upper end of which is fastened firmly to the upper end of the inside of the lift side of the said slotted post, and the lower end, bent to a right angle, passes through a mortise in said post near its bottom, and projects inward about ten inches (more or less) from said post.

On the inside of the right-hand carriage-shaft I fasten a lever, N, with a bolt or hinge. This lever passes through the lower end of the spring M, that projects inward, and is inclined backward at an angle of about thirty degrees, that it may be within reach of the hand of the operator.

The method of operating my said invention is as follows, namely: Whenever I desire to cut deep furrows I allow the lever H to fall backward till the stop K rests against the axle-tree of the carriage; but when I wish to make lighter furrows I draw the lever H forward to any desired position, and hold it there, or move it backward or forward, according to the conformation of the ground or the obstacles to be avoided. It will be readily seen that by moving the lever H, I raise or lower the cultivator at will by means of the chains D attached to the said arms of the windlass. When I desire to lift the cultivator entirely from the ground I press the lever H forward, and, placing my foot upon it, I force it down into the slotted post, and it becomes fastened securely under the spring M. This arrangement is found exceedingly useful when in the act of turning around at the end of a furrow and when traveling to and from the field in which the cultivator is used. By moving the lever N sidewise the spring M is removed from the lever H and the cultivator is dropped upon the ground. My arrangement of these levers, spring-windlass, and chains will be found exceedingly useful in hay-rakes and other kindred machines.

What I claim as my invention, and desire to secure by Letters Patent, is—

1. The shafts A, chains C and D, and cultivator B, combined and arranged substantially as described, and for the purposes specified.

2. The spring M, lever N, and slotted standard L, when used for the purposes herein set forth, substantially as described.

HORACE H. WEBSTER.

Witnesses:
H. W. TUCKER,
SYLVESTER DAVIS.